US009921411B2

(12) United States Patent
Lee et al.

(10) Patent No.: US 9,921,411 B2
(45) Date of Patent: Mar. 20, 2018

(54) STEREOSCOPIC LIGHTING DEVICE AND VEHICLE LIGHTING DEVICE USING THE SAME

(71) Applicant: LG INNOTEK CO., LTD., Seoul (KR)

(72) Inventors: Byoung Eon Lee, Seoul (KR); Hyun Duck Yang, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 14/612,844

(22) Filed: Feb. 3, 2015

(65) Prior Publication Data

US 2015/0219908 A1 Aug. 6, 2015

(30) Foreign Application Priority Data

Feb. 5, 2014 (KR) .................. 10-2014-0013286

(51) Int. Cl.
*G02B 27/22* (2018.01)
*F21S 8/10* (2006.01)
*F21V 8/00* (2006.01)

(52) U.S. Cl.
CPC ............ *G02B 27/22* (2013.01); *F21S 48/215* (2013.01); *F21S 48/2212* (2013.01); *F21S 48/234* (2013.01); *F21S 48/24* (2013.01); *G02B 6/0021* (2013.01); *G02B 6/0041* (2013.01); *G02B 6/0055* (2013.01); *G02B 6/0073* (2013.01)

(58) Field of Classification Search
CPC .. G02B 27/2214; G02B 27/22; G02B 6/0055; G02B 6/0021; G02B 6/0041; G02B 6/0073; H04N 13/0404; H04N 13/0409; H04N 13/0445; G03B 35/24; F21S 48/215; F21S 48/2212; F21S 48/234; F21S 48/24

USPC .......................................................... 359/463
See application file for complete search history.

(56) References Cited

U.S. PATENT DOCUMENTS

| | | | | |
|---|---|---|---|---|
| 6,333,819 B1* | 12/2001 | Svedenkrans | .......... | G02B 23/10 359/630 |
| 2006/0056032 A1* | 3/2006 | Tsukuda | .................... | B32B 7/02 359/619 |
| 2008/0094842 A1* | 4/2008 | King | .................... | F21S 48/1159 362/297 |

(Continued)

FOREIGN PATENT DOCUMENTS

| | | |
|---|---|---|
| DE | 10 2008 029450 A1 | 12/2009 |
| EP | 1 916 471 A1 | 4/2008 |

(Continued)

OTHER PUBLICATIONS

Extended European Search Report dated Jul. 2, 2015 issued in Application No. 15153902.0.

*Primary Examiner* — Bumsuk Won
*Assistant Examiner* — Henry Duong
(74) *Attorney, Agent, or Firm* — KED & Associates, LLP

(57) ABSTRACT

Provided are a stereoscopic display device capable of implementing a deep three-dimensional effect via a light source module having a thin thickness and a vehicle lighting device using the stereoscopic display device, the stereoscopic lighting device, including: a base substrate; a light source on the base substrate; a reflective layer disposed on one surface of the base substrate; a light guide layer burying the light source and the reflective layer; and a first half mirror layer disposed on the light guide layer.

13 Claims, 4 Drawing Sheets

(56) References Cited

U.S. PATENT DOCUMENTS

| | | | | |
|---|---|---|---|---|
| 2010/0110330 A1* | 5/2010 | Ajichi | G02F 1/133611 |
| | | | | 349/62 |
| 2011/0050655 A1* | 3/2011 | Mukawa | G02B 27/0172 |
| | | | | 345/204 |
| 2011/0317096 A1* | 12/2011 | Yokota | G02F 1/133606 |
| | | | | 349/64 |
| 2012/0170253 A1* | 7/2012 | Park | G02F 1/133608 |
| | | | | 362/97.1 |
| 2014/0204580 A1* | 7/2014 | Yeo | G02F 1/133603 |
| | | | | 362/235 |
| 2015/0036336 A1* | 2/2015 | Yang | G02B 6/0021 |
| | | | | 362/235 |

FOREIGN PATENT DOCUMENTS

| | | |
|---|---|---|
| EP | 2 474 857 A2 | 7/2012 |
| EP | 2 680 053 A1 | 1/2014 |
| JP | H05-49515 U | 6/1993 |
| KR | 20120004222 A * | 1/2012 |
| WO | WO 2011/113937 A1 | 9/2011 |

* cited by examiner

STEREOSCOPIC LIGHTING DEVICE AND VEHICLE LIGHTING DEVICE USING THE SAME

CROSS-REFERENCE TO RELATED APPLICATION

This application claims priority under 35 U.S.C. § 119 to Korean Application No. 10-2014-0013286 filed on Feb. 5, 2014, in the Korean Intellectual Property Office, whose entire disclosure is incorporated herein by reference.

BACKGROUND OF THE INVENTION

1. Field

Embodiments of the present application relate to a stereoscopic lighting device capable of implementing a deep three-dimensional effect via a light source module having a thin thickness and a vehicle lighting device using the stereoscopic lighting device.

2. Background

A lighting device has been recently developed so as to implement stereoscopic lighting through a dot, line, or surface form. For example, a research and development has been performed for 3D stereoscopic lighting resulting from disposing a plurality of LED light sources in a three-dimensionally twisted fluorescent lamp or a three-dimensional structure beyond an incandescent light in a point light source form, a fluorescent lamp in a line light source form, and LED flat lighting in a surface light source form The 3D stereoscopic lighting is lighting resulting from arranging a plurality of light sources in a 3D structure and turning on the plurality of light sources three-dimensionally arranged in various forms. The 3D stereoscopic lighting has been applied to the external wall of a building, a lighting device for a vehicle, or the like.

A stereoscopic lighting device for a vehicle applied to some luxury cars is configured so as to provide 3D stereoscopic lighting by disposing a plurality of LED light sources in a three-dimensional structure such as a step type structure installed along a curved surface of a vehicle and by reflecting light via a mirror formed in an inner side of the three-dimensional structure.

However, the conventional stereoscopic lighting device for the vehicle is disadvantageous in that a design and production process become complicated because the plurality of LED light sources is disposed in the three-dimensional structure in order to implement the 3D stereoscopic lighting, and production costs are increased because luminous intensity required by the vehicle should be fixed by covering a wide light emitting area of the stereoscopic lighting device via the LED light sources having a narrow glancing angle, and thus a large number of LED light sources should be used.

Also, in the conventional stereoscopic lighting device for the vehicle, since the 3D stereoscopic lighting is performed based on the three-dimensional structure, a plurality of LEDs should be densely disposed between the three-dimensional structures in order to form natural 3D stereoscopic lighting, or a complicated structure and control process are needed for brightly or darkly controlling the luminous of lighting emitted from the plurality of LEDs. Thus, it is disadvantageous in that this environment causes an increase in costs.

BRIEF DESCRIPTION OF THE DRAWINGS

The embodiments will be described in detail with reference to the following drawings in which like reference numerals refer to like elements wherein.

DETAILED DESCRIPTION

Figure 1:
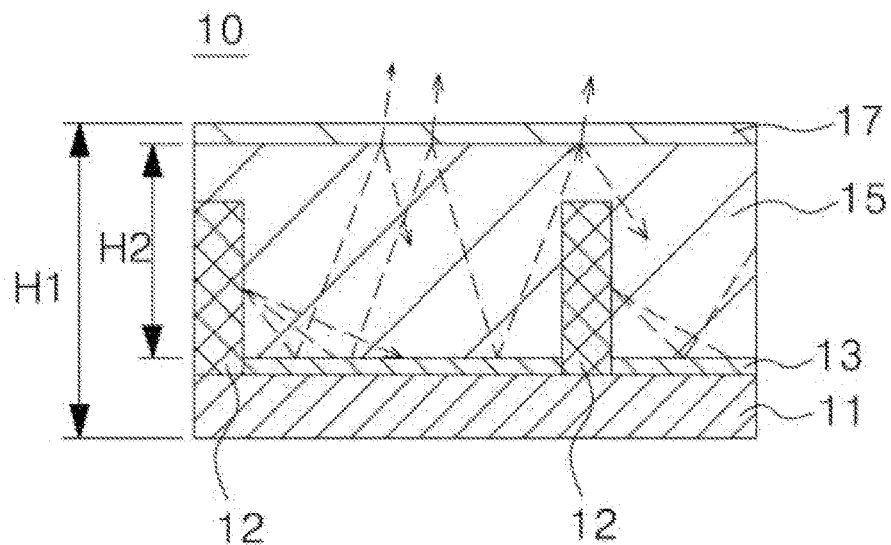
FIG. 1 is a cross-sectional of a stereoscopic lighting device according to a first embodiment of the present application.

Hereinafter, the embodiments of the present application that an ordinary person skilled in the art can implement will be described with reference to the accompanying drawings. The embodiments in the specification and the constructions shown in the drawings are provided as a preferred embodiment of the present application, and it should be understood that there may be various equivalents and modifications which could substitute at the time of filing. In addition, when it comes to the operation principle of the preferred embodiments of the present application, when the known functions or functions are seemed to make unclear the subject matters of the present application, they will be omitted from the descriptions of the invention. The terms below are defined in consideration of the functions of the present application, and the meaning of each term should be interpreted by judging the whole parts of the present specification, and the elements having the similar functions and operations of the drawings are given the same reference numerals. As used herein, the singular forms are intended to include the plural forms as well, unless the context clearly indicates otherwise.

FIG. 1 is a cross-sectional of a stereoscopic lighting device according to a first embodiment of the present application;

Referring to FIG. 1, a stereoscopic lighting device 10 according to the present embodiment includes: a base substrate 11; a light source 12; a reflective layer 13; a light guide layer 15; and a half mirror layer 17 (hereinafter referred to as 'the first half mirror layer'). The stereoscopic lighting device 10 may have a thickness H1 of about 4 mm.

The base substrate 11 supports the stereoscopic lighting device 10 including the light source 12, the reflective layer 13, the light guide layer 15 and the first half mirror layer 17. The base substrate 11 may be made of a rigid material or a ductile material. When the base substrate is made of the ductile material, the stereoscopic lighting device 10 may be a flexible stereoscopic lighting device.

The light source 12 is provided on the base substrate 11. The light source 12 may be closely attached to the light guide layer 15, and a thickness H2 of the light guide layer 15 may range from about 2 to 3 mm. In the present embodiment, the light source 12 may be a light source using an LED (Light Emitting Diode) having a narrow irradiating angle.

When the LED is used as the light source, the light source 12 may include an LED element and a printed circuit board to which the LED element is mounted. A rigid printed circuit board such as FR4 and the like and a flexible printed circuit board, and the like may be used as the printed circuit board.

In the printed circuit board of the light source 12, the LED elements are mounted to a surface or the inside of an insulating member, and a circuit pattern for electrically connecting the LED elements or the LED element and a driving circuit is provided. The printed circuit board may be arranged on the base substrate without being limited thereto. That is, the printed circuit board of the light source 12 may be the base substrate 11. In such a case, the formation of a separate base substrate may be omitted.

The light source 12, which is an LED element, may include a top view type LED (Light Emitting Diode), a side view type LED or a combination thereof. When the top view type LED is used, the light source 12 is mounted to a side of the base substrate 11 and emits light in a direction (hereinafter referred to as 'the lateral direction') which appropriately crosses at right angles to a thickness direction of the light guide layer 15.

The reflective layer 13 covers the base substrate 12. The reflective layer 13 is arranged at a back side of the light source 12 and reflects light emitted from the light source and light reflected from the first half mirror layer 17 so that the light of the light source can be guided in the lateral direction within the light guide layer 15 and can travel to a front surface (upper surface as viewed in FIG. 1) of the stereoscopic lighting device 10. The reflective layer 13 is made of a material having excellent reflection efficiency so as to function to reduce the loss of light emitted from the light source 12.

The reflective layer 13 may be formed in a film form such as an Ag film or the like. Also, in order to implement a property for promoting the reflection and dispersion of light, the reflective layer may be made of a synthetic resin dispersively containing a white pigment. For example, titanium oxide, aluminum oxide, zinc oxide, lead carbonate, barium sulfate, calcium carbonate and the like may be used as the white pigment. Polyethylene terephthalate, polyethylene naphthenate, acryl resin, poly carbonate, polystyrene, polyolefin, cellulose acetate, vinyl chloride and the like may be used as the synthetic resin, but the present application is not limited to such a configuration.

The light source 12 and the reflective layer 13 are embedded by the light guide layer 15. The light guide layer 15 is arranged between the reflective layer 13 and the first half mirror layer 17 in a sandwich-like shape. The light guide layer 15 functions to diffuse and guide light emitted from light source 12 in a side direction via multiple reflections of the reflective layer 13 and the first half mirror layer 17. An part of the light guided to the inside of the light guide layer 15 penetrates the first half mirror layer and is irradiated from a front surface adjacent to the light source 12 to the outside. Another part of the light is guided between the first half mirror layer 17 and the reflective layer 13 to the lateral direction via multiple reflection and is irradiated from a front surface located far away relatively from the light source 12 to the outside.

The light guide layer 15 may be implemented as a light guide plate or a light guide resin. When the light guide layer is formed as the light guide resin, namely, resin layer, a thickness of the light guide layer 15 may be reduced up to about half compared to a case in which the light guide plate is used. The light guide layer 15 may be closely attached to the light emitting surface of the light source 12 or the light guide layer 15 may be integrally formed with the light source 12 so that the structure can be simplified, and light efficiency can be increased.

The improvement of light efficiency by the light guide layer 15 may be achieved by an increase in the quantity of light emitted from the LED element generated by a difference in refractive indexes between the phosphor silicon and the light guide layer arranged at the front of the LED element. For example, in general, since the refractive index of the phosphor silicon is 1.5, and the refractive index of the resin layer is 1.47, as the mediums through which the light passes have a small difference in refractive indexes, a critical angle is increased. As a result, the loss of light generated from the inside of the LED element may be reduced so that the quantity of light emitted from the LED element can be increased. Also, the improvement of light efficiency may be achieved by reducing the leakage of light caused by a structure in which the light is emitted to the inside of the light guide layer 15 corresponding to an optical member.

The first half mirror layer 17 is provided on the light guide layer 15. The first half mirror layer 17 has a predetermined transmittance and reflectance. The first half mirror layer 17 may refer to a translucent mirror and may be implemented with a coating layer, a film substrate, or the like. For example, the first half mirror layer 17 may be manufactured so as to transmit light by thinly depositing a metal such as Ni, Al, Ti or the like on a plate-shaped surface of a transparent material in an ultra thin-film form. In such a case, a thickness of the metal thin film may be about 300 Å. Also, a plastic product provided with a metallic effect and a mirror effect using a polycarbonate or acryl material may be used as the first half mirror layer 17.

When the first half mirror layer is implemented using the acryl material, the first half mirror layer 17 may be harmless to humans and may have surface gloss, wear resistance, deformation resistance resulting from acryl. Furthermore, the first half mirror layer may have a light and strong strength property compared to a glass, aluminum or magnesium layer having the same thickness.

In order to clearly implement a perceptional depth effect, a distance H2 between the reflective layer 13 and the first half mirror layer 17 is set to be more than ½ of a thickness H1 of the stereoscopic lighting device 10. In the present embodiment, the distance H2 may be about 2 to 3 mm. When the distance H2 is smaller than 2 mm, a perceptional depth may not relatively clearly displayed. Here, the thickness of about 3 mm is a thickness that can be maximally secured when the total thickness H1 is about 4 mm. This thickness may be increased according to a total thickness, as a thickness which can be maximally secured, or according to a thickness of the light guide layer 15.

Figure 6:
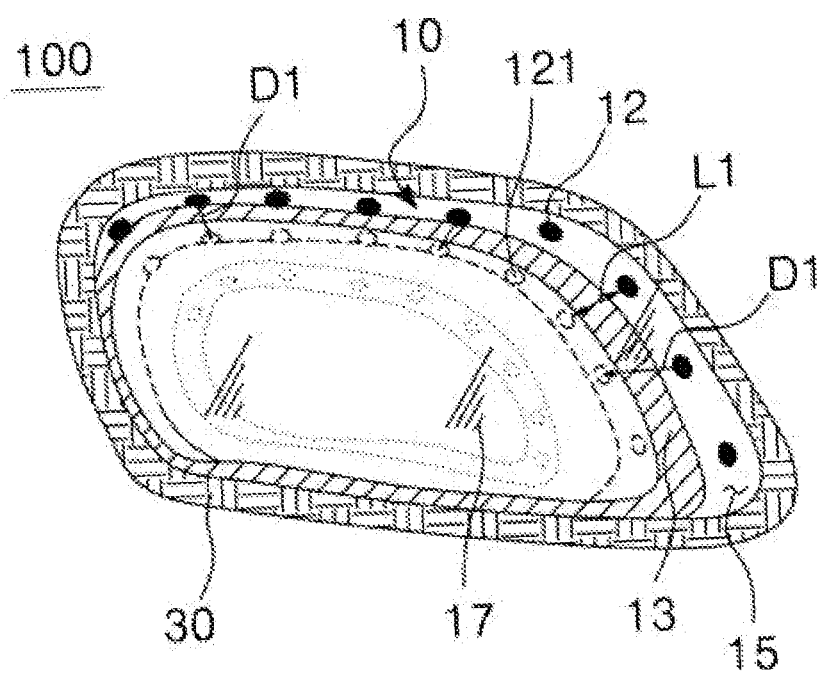
FIG. 6 is a schematic front view of a vehicle lighting device using a stereoscopic lighting device according to an embodiment of the present application.

According to the present embodiment, stereoscopic lighting having a perceptional inward depth effect (perspective) may be easily implemented by the reflective layer 13 and the half mirror layer 17 on both surfaces of the light guide layer 15 in the flexible lighting device configured to include the light guide layer 15 burying the light source 12 (see FIG. 6). Furthermore, a distance between the reflective layer 13 and the half mirror layer 17 is conveniently controlled by adjusting a thickness of the light guide layer 15 so that stereoscopic lighting having a desired perceptional depth effect according to an application can be effectively designed and produced.

Figure 2:
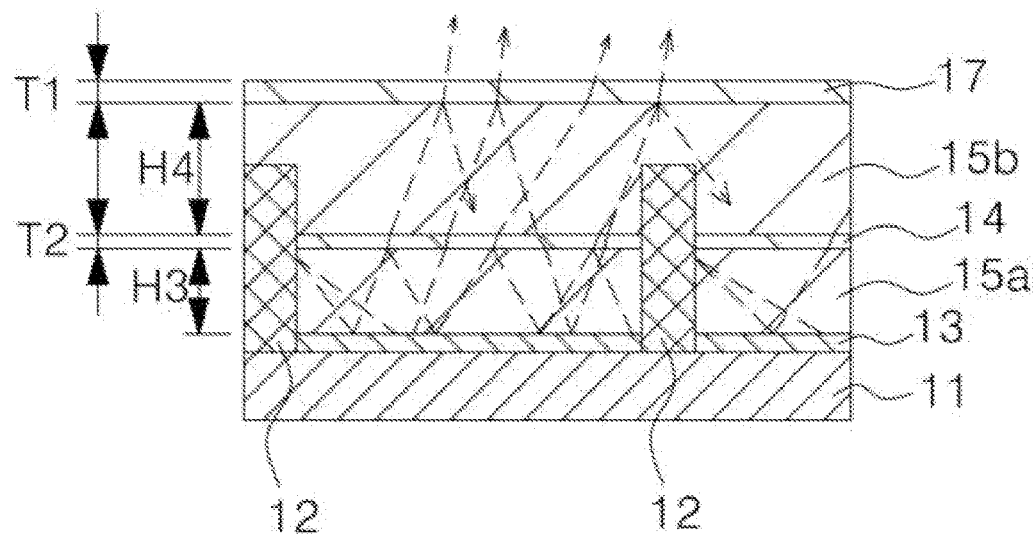
FIG. 2 is a cross-sectional of a stereoscopic lighting device according to a second embodiment of the present application.

FIG. 2 is a cross-sectional of a stereoscopic lighting device according to a second embodiment of the present application.

Referring to FIG. 2, a stereoscopic lighting device according to the present embodiment includes: a base substrate 11; a light source 12; a reflective layer 13; a light guide layer 15; a first half mirror layer 17; and a second half mirror layer 14.

In the present embodiment, the stereoscopic lighting device is substantially identical to the stereoscopic lighting device previously explained with reference to FIG. 1 except for the second half mirror layer 14. Thus, in order to avoid overlapping of the description, the detailed description of the same or similar constitutive elements is omitted.

The second half mirror layer 14 is provided on the reflective layer 13. The second half mirror layer 14 divides the light guide layer (see reference numeral 15 of FIG. 1) into a first light guide layer 15a on the reflective layer 13 and a second light guide layer 15b on the second half mirror layer.

A refractive index of the first light guide layer 15a is identical to that of the second light guide layer 15b. When the refractive index of the first light guide layer 15a is not substantially identical to that of the second light guide layer 15b, most of light emitted from the light source 12 is guided to a lateral direction through any one gap of a gap between the reflective layer 13 and the second half mirror layer 14, and a gap between the second half mirror layer 14 and the first half mirror layer 17 according to the refractive indexes. Thus, it is difficult to properly obtain a perceptional depth effect resulting from a distance between the reflective layer 13 and the first half mirror layer 17.

Also, the second half mirror layer 14 may have the same transmittance and reflectance as those of the first half mirror layer. Preferably, the second half mirror layer may arranged so as to have higher transmittance than that of the first half mirror layer 17 and lower reflectance than that of the first half mirror layer 17. This is intended to enable light guiding to preferentially be performed in a lateral direction by basic multiple reflection between the reflective layer 13 and the first half mirror layer 17 by largely setting transmittance of the second half mirror layer 14 arranged between the reflective layer 13 and the first half mirror layer 17.

To do so, a thickness T2 of the second half mirror layer 14 is identical to a thickness T1 of the first half mirror layer 17 or is thinner than that of the first half mirror layer 17. This configuration may be usefully used upon implementing the second half mirror layer 14 and the first half mirror layer 17 using a half mirror film having a first reflectance in a first thickness and having a second reflectance lower than the first reflectance in a second thickness.

According to the present embodiment, with regard to the flexible lighting, when stereoscopic lighting having a perceptional inward depth effect (perspective) is implemented by the reflective layer 13 and the first half mirror layer 17 on both surfaces of the light guide layer 15, a natural or unnatural perceptional depth effect implemented be optionally controlled according to a position and a thickness of the second half mirror layer 14. Thus, it is advantageous in that stereoscopic lighting having various shapes can be easily implemented.

Figure 3:
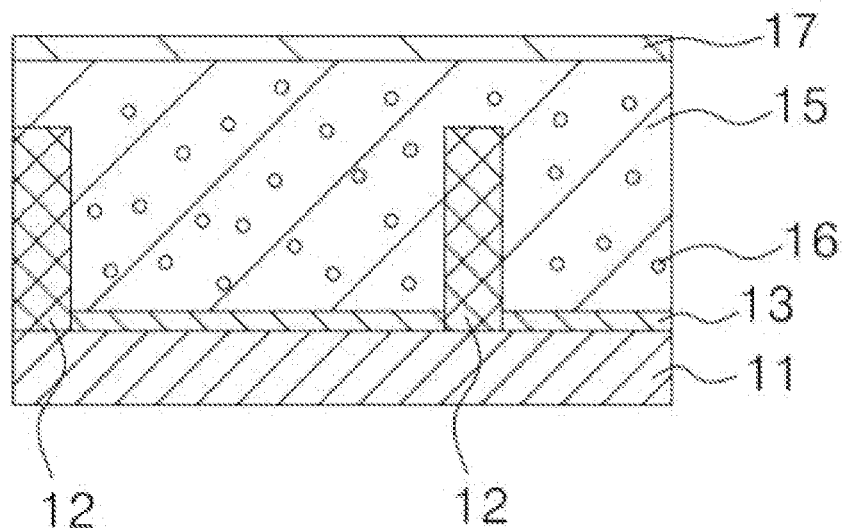
FIG. 3 is a cross-sectional of a stereoscopic lighting device according to a third embodiment of the present application.

FIG. 3 is a cross-sectional of a stereoscopic lighting device according to a third embodiment of the present application.

Referring to FIG. 3, a stereoscopic lighting device according to the present embodiment includes: a base substrate 11; a light source 12; a reflective layer 13; a light guide layer 15; beads 16; and a first half mirror layer 17. The stereoscopic lighting device may further include a second half mirror layer 14.

The light guide layer 15 is provided as a resin layer to which beads 16 are added. The beads 16 are dispersively disposed in the inside of the resin layer so as to disperse and diffuse light of the light source 12 in a lateral direction. In order to improve the dispersion and reflection of light, the beads 16 may be contained in an amount of about 0.01 to 0.3% based on the total weight of the resin layer.

The light guide layer 15 may be made of a UV curing resin containing an oligomer as a resin material which enables the diffusion of light. More specifically, the light guide layer 15 may be implemented using a resin layer containing a urethane acrylate oligomer as a main raw material. For example, a resin in which the urethane acrylate oligomer corresponding to a synthetic oligomer and an acryl polymer are mixed may be used.

The oligomer may contain urethane acrylate, epoxy acrylate, polyester acrylate, acrylic acrylate, or a combination thereof.

The beads 16 may contain polyethylene terephthalate, silicon, silica, glass bubble, PMMA (Polymethyl Methacrylate), urethane, zinc, zirconium, $Al_2O_3$, acryl, or a combination thereof.

Of course, the light guide layer 15 may further contain a monomer in which IBOA (isobornyl acrylate), HPA (hydroxylpropyl acrylate), 2-HEA (2-hydroxyethyl arrylate) and the like are mixed, the monomer corresponding to a low boiling point and diluted type reactive monomer. Also, a photo initiator (1-hydroxycyclohexyl phenyl-ketone and the like) or an antioxidant may be further mixed as an additive.

According to the present embodiment, the light emitted from the light source 12 is diffused and reflected through the light guide layer 15 and the beads 16 between the reflective layer 13 and the first half mirror layer 17 and travels to the front surface (upper direction) while being guided to a lateral direction of the light guide layer 15. Thus, three-dimensional lighting having a perceptional depth effect may be easily implemented.

Figure 4:
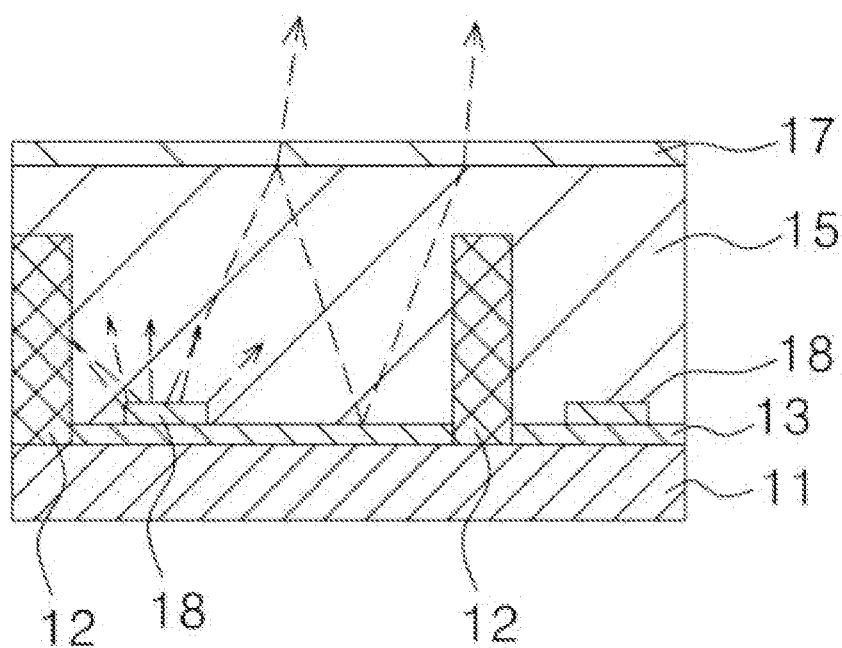
FIG. 4 is a cross-sectional of a stereoscopic lighting device according to a fourth embodiment of the present application.

FIG. 4 is a cross-sectional of a stereoscopic lighting device according to a fourth embodiment of the present application.

Referring to FIG. 4, a stereoscopic lighting device according to the present embodiment includes: a base substrate 11; a light source 12; a reflective layer 13; a light guide layer 15; a first half mirror layer 17; and a reflective pattern 18. The stereoscopic lighting device may further include a second half mirror layer 14, beads 16, or a combination thereof.

Referring to FIG. 4, a stereoscopic lighting device according to the present embodiment includes: a base substrate 11; a light source 12; a reflective layer 13; a light guide layer 15; a first half mirror layer 17; and a reflective pattern 18.

The reflective pattern 18 is provided between the reflective layer 13 and the light guide layer 15. The reflective pattern 18 diffuses and disperse light incident to the reflective layer 13 so that the light can be uniformly transmitted to a front surface on which the first half mirror layer 17 is arranged.

In the present embodiment, in order to implement a three-dimensional effect that grows deeper according to each distance from the light source, the reflective pattern 18 may be disposed between two adjacent light sources each having light emitting surfaces 121 toward the same direction to be adjacent to the light emitting surface 121 of the light source 12 irradiating light from the reflective pattern. In this case, a difference in radiation amounts of light emitted from the outside according to each distance from the light source 12 is generated so that a perceptional depth effect can be improved.

Also, the reflective pattern 18 may be configured to include a protruding pattern structure. In this case, in order to increase the scattering effect of light, the reflective pattern may be formed in a dot pattern form, a prism form, a lenticular form, a lens form or a combination thereof, but the form is not limited thereto. A cross section of the reflective pattern 18 may have various shapes such as a triangular shape, a quadrangular shape, a semicircular shape, a sine wave-like shape and the like. The pattern shapes of the reflective pattern 18 may enable light emitting paths to be variously formed upon implementing three-dimensional lighting so that various three-dimensional shapes can be designed.

The reflective pattern 18 may be implemented by printing the reflective pattern on a surface of the reflective layer 13 using an reflective ink containing $TiO_2$, $CaCO_3$, $BaSO_4$, $Al_2O_3$, silicon, polystyrene (PS), or a combination thereof, but the present application is not limited to this configuration.

When the reflective pattern is formed using the reflective ink, the reflective pattern 18 may be integrally formed with the reflective layer 13. For example, according to arrangement of the light source 12, the reflective pattern 18 may be designed in consideration of a portion of the reflective layer 13 having higher reflectance and another portion of the reflective layer having lower reflectance. When the design of the reflective pattern is prepared, the reflective pattern 18 may be formed on the reflective layer 13 via a printing process.

With regard to the printing process, an overlapping printing process (printing of FIGS. 2 and 3) as well as a printing process of FIG. 1 may be applied so that the reflective pattern can be implemented in a desired thickness in a desired position and place. Thus, the reflective layer integrally formed with the reflective pattern and provided in a convex hill form in a middle portion between the adjacent light sources (a middle portion adjacent to the light emitting surface of one light source) on the base substrate may be easily formed.

Figure 5:
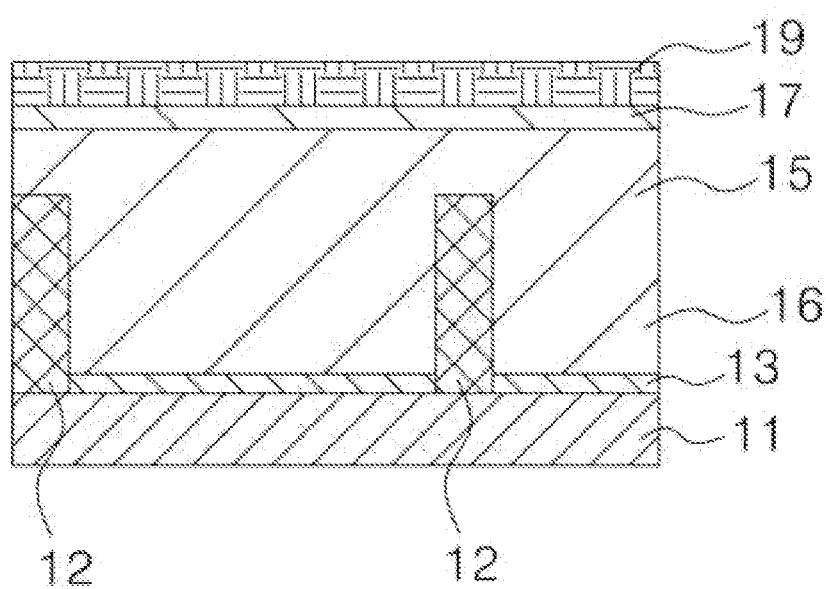
FIG. 5 is a cross-sectional of a stereoscopic lighting device according to a fifth embodiment of the present application.

FIG. 5 is a cross-sectional of a stereoscopic lighting device according to a fifth embodiment of the present application.

Referring to FIG. 5, a stereoscopic lighting device according to the present embodiment includes: a base substrate 11; a light source 12; a reflective layer 13; a light guide layer 15; a first half mirror layer 17; and an outer lens 19. The stereoscopic lighting device may include: a second half mirror layer 14; beads 16; a reflective pattern 18; and a combination thereof.

The outer lens 19 is provided on the first half mirror layer 17. The outer lens 19 is a lens arranged at the outermost side of the stereoscopic lighting device and has a property required by an application (a vehicle and the like). In the case of a vehicle, the outer lens 19 may be implemented using an acryl film and the like. When the acryl film having high strength and strong stress is used, a mold product having a perceptional depth effect can be easily implemented.

The arrangement of the light source 12 buried by the light guide layer 15 or the reflective pattern 18 may be adjusted according to a structure or shape of the outer lens 19, or a curved pattern, or the stereoscopic lighting device having various shapes and an excellent perceptional depth effect may be easily implemented by adjusting a thickness of the light guide layer 15.

FIG. 6 is a front view of a vehicle lighting device using a stereoscopic lighting device according to an embodiment of the present application.

Referring to FIG. 6, a vehicle lighting device according to the present application includes: a stereoscopic lighting device 10; and an instrument 30 supporting the stereoscopic lighting device.

The stereoscopic lighting device 10 includes: the base substrate; the light source 12 on the base substrate; the reflective layer 13 covering the base substrate; the light guide layer 15 burying the light source and the reflective layer; and the first half mirror layer 17 on the light guide layer. The light source 12 may be arranged to irradiate light toward a predetermined direction D1. Furthermore, as a distance (see H2 of FIG. 1) between the reflective layer 13 and the first half mirror layer 17 gradually increases, a distance L1 between the light source 12 and the adjacent light source 12 may increase.

Also, the stereoscopic lighting device 10 may be composed of any one of the stereoscopic lighting devices previously explained with reference to FIGS. 1 to 5. The stereoscopic lighting device 10 may be provided as at least one vehicle lamp of an interior lamp for a vehicle, a door scarf, a rear combination lamp, a fog lamp and a back up lamp. In such a case, the stereoscopic lighting device 10 may have an arbitrary curved surface and shape according to each shape or structure of an application (vehicle and the like) to which the stereoscopic lighting device is applied, or according to each shape or structure of a specific component (lamp and the like) of the application.

The instrument 30 refers to an element for enabling the stereoscopic lighting device 10 to be stably attached or mounted according to the structure and shape of the stereoscopic lighting device 10, or a constitution part performing a function corresponding to this element. The instrument 30 may be made of a material, which can be used as an exterior material of a vehicle and the like. The instrument may be coupled to at least one side of the stereoscopic lighting device 10 or may be mounted to the application in a state of entirely surrounding an edge of the application. The instrument 30 may contain an elastic material, a non-elastic material, or a combination thereof.

Also, according to some embodiments, the instrument 30 may be integrally provided with an outer lens (see reference numeral 19 of FIG. 5). In this case, the instrument 30 and the outer lens are simultaneously manufactured by a single injection process, and the stereoscopic lighting device in a flexible film form is attached to an inner surface of the outer lens so that the instrument can be easily produced, thereby enabling the reduction of a cost.

According to the present embodiment, three-dimensional lighting having a perceptional depth effect in vehicle lighting may be easily implemented by the reflective layer 13 and the half mirror layer 17 arranged on both main surfaces of the light guide layer in a thickness direction of the light guide layer integrally formed with the light source 12 to face each other.

In other words, when light is irradiated from the light source 12, three-dimensional lighting having a more increased perceptional inward depth effect (perspective) may be provided according to an increase in a distance between the reflective layer 13 and the half mirror layer 17. Furthermore, even though the light is not irradiated from the light source 12, thanks to a sandwich-like structure formed by the reflective layer 1, the light guide layer 15 and the half mirror layer 17, a three-dimensional structure having a fine appearance may come into sight. That is, the vehicle lighting device may have a three-dimensional lighting effect similar to an image as viewed with a mirror as the center.

Moreover, the stereoscopic lighting device according to some embodiments of the present application may be applied to various lamp devices for which lighting is needed, such as a lamp for a vehicle, a home lighting device, an industrial lighting device and the like. For example, when the stereoscopic lighting device is applied to the vehicle lamp, the stereoscopic lighting device may be applied to an interior lamp for a vehicle, a door scarf, a rear combination lamp, a fog lamp, a backup lamp, and the like. Also, the stereoscopic lighting device according to some embodiments of the present application may be also applied to the field of indoor and outdoor advertisement apparatuses. In addition to this, the stereoscopic lighting device may be applied to all lighting and advertisement-related fields that have been developed and commercialized or may be implemented according to further technical development.

As set forth above, some embodiments of the present application may provide the stereoscopic lighting device capable of easily implementing a deep three-dimensional effect via a light source module having a thin thickness by using the light guide layer burying the light source and the reflective layer and the half mirror layer on the light guide layer.

According to some embodiments, it is advantageous in that the stereoscopic lighting device can provide various design effects upon forming a three-dimensional beam by using an arrangement relation of the reflective layer and the half mirror layer between which the light guide layer is interposed.

According to some embodiments, it is advantageous in that the stereoscopic lighting device can reduce the number of LED (Light Emitting Diode) light sources adopted for three-dimensional lighting and can enable easy production by using a laminated structure of the reflective layer, the light guide layer and the half mirror layer.

According to some embodiments, it is advantageous in that the stereoscopic lighting device may easily implement a function of changing the shape of light and a three-dimensional effect according to a viewing angle by using the second half mirror layer of the inside of the flexible light guide layer.

According to some embodiment of the present application, it is advantageous in that the vehicle lighting device having high efficiency, a long lifespan, an environment friendly property, a high slimming property and high stability can show a stereo-geometrical effect as well as geometrical 3D light distribution upon emitting light by using a stereoscopic lighting device and can be easily applied to an application (vehicle and the like) having a housing with flexibility or a curve by using the stereoscopic lighting device including the light guide layer burying the light source and the reflective layer, and the half mirror layer facing the reflective layer with the light guide layer interposed between the reflective layer and the half mirror layer as the center.

An aspect of embodiments of the present application provides a stereoscopic lighting device capable of implementing a deep three-dimensional effect via a light source module having a thin thickness.

Another aspect of embodiments of the present application provides a stereoscopic lighting device that can reduce the number of LED (Light Emitting Diode) light sources and can be easily manufactured.

A further aspect of embodiments of the present application provides a vehicle lighting device having high efficiency, a long lifespan, an environment friendly property, a high slimming property and high stability that can show a stereo-geometrical effect as well as geometrical 3D light distribution upon emitting light by using a stereoscopic lighting device.

According to an aspect of embodiments of the present application, a stereoscopic lighting device may include: a base substrate; a light source on the base substrate; a reflective layer covering the base substrate; a light guide layer burying the light source and the reflective layer; and a first half mirror layer on the light guide layer.

In one embodiment, the stereoscopic lighting device may further include a second half mirror layer on the reflective layer. The second half mirror layer may divide the light guide layer into a first light guide layer on the reflective layer, and a second light guide layer on the second half mirror layer. Here, a refractive index of the first light guide layer may be identical to that of the second light guide layer.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present application and is not to be construed as limited to the specific embodiments disclosed, and that modifications to the disclosed embodiments, as well as other embodiments, are intended to be included within the scope of the appended claims and their equivalents.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting device, comprising:
a base substrate;
a light source on the base substrate;
a reflective layer provided on one surface of the base substrate;
a light guide layer burying the light source and the reflective layer, the light guide layer including a first light guide layer provided on the reflective layer and a second light guide layer provided on the first light guide layer;
a first half mirror layer provided on the second light guide layer; and
a second half mirror layer provided between the first light guide layer and the second light guide layer,
wherein light transmittance of the second half mirror layer is higher than that of the first half mirror layer, and reflectance of the second half mirror layer is lower than that of the first half mirror layer,
wherein the second half mirror layer is thinner than the first half mirror layer, and wherein the light source is formed to physically penetrate through the first light guide layer and the second half mirror layer.

2. The lighting device of claim 1, wherein a first light beam emitted from the light source becomes a second light beam reflected by the second half mirror layer and a third light beam transmitted to the second half mirror layer, and wherein the third light beam becomes a fourth light beam reflected by the first half mirror layer and a fifth light beam transmitted to the first half mirror layer.

3. The lighting device of claim 2, wherein the light source emits light toward a side surface of the light guide layer.

4. The lighting device of claim 1, wherein a distance (H2) between the reflective layer and the first half mirror layer is more than ½ of a thickness (H1) of the stereoscopic lighting device and wherein the distance (H2) between the reflective layer and the first half mirror layer is in the range of 2~3 mm.

5. The lighting device of claim 1, wherein a refractive index of the first light guide layer is identical to that of the second light guide layer.

6. The lighting device of claim 1, further comprising a reflective pattern between the reflective layer and the light guide layer, wherein the reflective pattern is arranged on the reflective layer to be adjacent to a light emitting surface of the light source, and
wherein the reflective pattern is integrally provided with the reflective layer.

7. The lighting device of claim 1, further comprising an outer lens on the first half mirror layer.

8. The lighting device of claim 7, wherein the outer lens include an acryl film.

9. The lighting device of claim 1, wherein the light guide layer is a resin layer closely attached to one surface of the reflective layer.

10. The lighting device of claim 1, wherein the light guide layer contains a UV curing resin including an oligomer closely attached to one surface of the reflective layer.

11. The lighting device of claim 10, wherein the oligomer includes urethane acrylate, epoxy acrylate, polyester acrylate, acrylic acrylate or a combination thereof.

12. The lighting device of claim 11, further comprising beads provided in the inside of the light guide layer.

13. A vehicle lighting device, comprising:
the lighting device of claim 1; and
an instrument that supports the lighting device.

* * * * *